US010004068B2

(12) United States Patent
Chai et al.

(10) Patent No.: US 10,004,068 B2
(45) Date of Patent: Jun. 19, 2018

(54) METHOD, DEVICE AND SYSTEM FOR UPLINK RESOURCE ALLOCATION

(71) Applicant: Huawei Technologies Co., Ltd., Shenzhen, Guangdong (CN)

(72) Inventors: Li Chai, Shenzhen (CN); Yan Wang, Shenzhen (CN); Bo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 846 days.

(21) Appl. No.: 14/487,648

(22) Filed: Sep. 16, 2014

(65) Prior Publication Data

US 2015/0029988 A1      Jan. 29, 2015

Related U.S. Application Data

(63) Continuation of application No. PCT/CN2013/072801, filed on Mar. 18, 2013.

(30) Foreign Application Priority Data

Mar. 16, 2012 (CN) .......................... 2012 1 0070820

(51) Int. Cl.
*H04W 72/04* (2009.01)
*H04W 72/08* (2009.01)

(52) U.S. Cl.
CPC ... *H04W 72/0446* (2013.01); *H04W 72/0426* (2013.01); *H04W 72/082* (2013.01)

(58) Field of Classification Search
None
See application file for complete search history.

(56) References Cited

U.S. PATENT DOCUMENTS

2011/0310830 A1* 12/2011 Wu ................... H04W 72/1289
                                                                370/329
2012/0113812 A1*  5/2012 Ji ...................... H04W 72/1263
                                                                370/241

(Continued)

FOREIGN PATENT DOCUMENTS

CN          102025411 A         4/2011
CN          102149099 A         8/2011

(Continued)

OTHER PUBLICATIONS

New Postcom, "considerations for interactions between FD and TD ICIC", 3GPP TSG RAN WG3 Meeting #70BIS, Jan. 2011, all pages.*

*Primary Examiner* — Chirag Shah
*Assistant Examiner* — Srinivasa Reddivalam
(74) *Attorney, Agent, or Firm* — Leydig, Voit & Mayer, Ltd.

(57) ABSTRACT

The present disclosure discloses a method, a device and a system for uplink resource allocation, relating to a wireless communication field and used for further reducing interference of service transmission between cell uplinks. The method for uplink resource allocation includes: a first base station determines uplink almost blank subframe (UL ABS) subframe(s) unused currently of a user equipment (UE) served by the first base station; and the first base station sends information of the determined UL ABS subframe(s) unused currently of the UE served by the first base station to a second base station, so that the second base station acquires available UL ABS subframe(s) and takes the available UL ABS subframe(s) as uplink subframe resource(s) of the second base station. The present disclosure is applied to a resource allocation scenario.

10 Claims, 18 Drawing Sheets

(56) References Cited

U.S. PATENT DOCUMENTS

2012/0243488 A1* 9/2012 Gupta ............... H04W 72/0426
370/329
2014/0126501 A1 5/2014 Pan et al.

FOREIGN PATENT DOCUMENTS

CN 102186247 A 9/2011
WO WO 2011157236 A1 12/2011

* cited by examiner

# METHOD, DEVICE AND SYSTEM FOR UPLINK RESOURCE ALLOCATION

CROSS-REFERENCE TO RELATED APPLICATIONS

This application is a continuation of International Patent Application No. PCT/CN2013/072801, filed on Mar. 18, 2013, which claims priority to Chinese Patent Application No. 201210070820.9, filed on Mar. 16, 2012, both of which are hereby incorporated by reference in their entireties.

TECHNICAL FIELD

The present disclosure relates to a wireless communication field, and in particular to a method, a device and a system for uplink resource allocation.

BACKGROUND

Generally, a wireless communication system is a multiple access wireless system. In a wireless communication system, a base station sends transmission data and/or control information to a UE (User Equipment) through a downlink and receives data and/or control information sent by the UE through an uplink. That is to say, the UE sends the data and/or the control information to the base station through the uplink and receives the transmission data and/or the control information sent by the base station through the downlink. Different types or different formats of base stations are deployed in a network to enhance a performance of the network and increase a coverage of the network, and this network structure is called as a heterogeneous network.

In order to improve a spectrum utilization efficiency of a system, complete or partial spectrum multiplexing may be implemented to configurable uplink and/or downlink spectrum resources of a low-power base station in a network and configurable uplink and/or downlink spectrum resources of a high-power base station in the network. At this time, the low-power base station is configured with identical or partially identical spectrum resources as the high-power base station, so co-channel or co-frequency interference may be generated between downlink channel transmission of the low-power base station and the high-power base station or between uplink channel transmission of the low-power base station and the high-power base station, and the interference may affect reliabilities of downlink channel transmission and uplink channel detection of the low-power base station and the high-power base station.

In the prior art, inter-cell interference in a heterogeneous network scenario is processed by adopting a method of time division multiplexing (TDM) inter cell interference coordination (ICIC) in a standard of LTE-A (Long Term Evolution-Advanced). A first base station sets certain subframes at a low transmission power or not to transmit a services (i.e., transmission power of the service is zero), and the above-mentioned subframes are called as ABS (Almost Blank Subframe). A second base station schedules a UE suffering strong interference of the first base station in ABS subframe(s) configured by the first base station for service transmission, so as to ensure a transmission performance of the UE suffering the strong interference. Due to existence of a downlink ABS subframe, an uplink ABS subframe may be derived implicitly according to a sequential relationship of HARQ (Hybrid Automatic Repeat Request). Therefore, inter-cell uplink interference coordination is implemented by using the implicit uplink ABS subframe.

In the prior art, there is at least the following problem: in the prior art, the uplink ABS subframe may be derived implicitly due to the existence of the downlink ABS subframe, and inter-cell uplink interference is coordinated by using the derived uplink ABS subframe, however, due to the uplink data are sent in the uplink ABS subframe sometimes in reporting of RACH (Random Access Channel) or the like, uplink service transmission of a neighboring cell may be still interfered.

SUMMARY

Embodiments of the present disclosure provide a method, a device and a system for uplink resource allocation, used for further reducing interference of service transmission between cell uplinks.

To achieve the above-mentioned objective, the embodiments of the present disclosure adopt the following technical solutions.

A method for uplink resource allocation, includes: determining, by a first base station, uplink almost blank subframe (UL ABS) subframe(s) unused currently of a user equipment (UE) served by the first base station; and sending, by the first base station, information of the determined UL ABS subframe(s) unused currently of the UE served by the first base station to a second base station, so that the second base station acquires available UL ABS subframe(s) and takes the available UL ABS subframe(s) as uplink subframe resource(s) of the second base station.

A base station includes: a first determining unit, configured to determine uplink almost blank subframe (UL ABS) subframe(s) unused currently of a user equipment (UE) served by the base station; and a first sending unit, configured to send information of the UL ABS subframe(s) unused currently of the UE determined by the first determining unit to a second base station, so that the second base station acquires available UL ABS subframe(s) and takes the available UL ABS subframe(s) as uplink subframe resource(s) of the second base station.

Another base station includes: a first receiving unit, configured to receive information of uplink almost blank subframe (UL ABS) subframe(s) and send the received information of the UL ABS subframe(s) to a selecting unit; and the selecting unit, configured to acquire available UL ABS subframe(s) according to the information of the UL ABS subframe(s) received by the first receiving unit, and allocate the available UL ABS subframe(s) to a UE served by the base station.

A system for uplink resource allocation, includes: a first base station, a second base station, a user equipment (UE) served by the first base station, and a user equipment (UE) served by the second base station, wherein the first base station is configured to determine UL ABS subframe(s) unused currently of the UE served by the first base station, send information of the determined UL ABS subframe(s) unused currently of the UE served by the first base station to the second base station, so that the second base station acquires available UL ABS subframe(s) and takes the available UL ABS subframe(s) as uplink subframe resource(s) of the second base station; and the second base station is configured to receive the information of the UL ABS subframe(s) sent by the first base station, acquire the available UL ABS subframe(s) according to the information of the UL ABS subframe(s) and allocate UL ABS subframe resource(s) to the UE served by the second base station.

According to the method, the device and the system for uplink resource allocation provided by the embodiments of the present disclosure, the first base station determines the UL ABS subframe(s) unused currently of the UE served by the first base station in all UL ABS subframe(s), and sends the information of the determined UL ABS subframe(s) unused currently of the UE served by the first base station to the second base station, so that the second base station acquires the available UL ABS subframe(s). In this way, when the second base station and the user equipment (UE) served by the second base station use the UL ABS subframe(s), it may be ensured that no instruction information is sent by the first base station and the UE served by the first base station in the above-mentioned UL ABS subframe(s), thereby further reducing interference of service transmission between cell uplinks.

BRIEF DESCRIPTION OF DRAWINGS

To illustrate technical solutions in the embodiments of the present disclosure or in the prior art more clearly, a brief introduction on the accompanying drawings which are needed in the description of the embodiments or the prior art will be given below. Apparently, the accompanying drawings in the description below are merely some of the embodiments of the present disclosure, based on which other drawings may be obtained by those of ordinary skill in the art without any inventive efforts.

DESCRIPTION OF EMBODIMENTS

A clear and complete description of technical solutions of the embodiments of the present disclosure will be given below, in combination with the accompanying drawings in the embodiments of the present disclosure. Apparently, the embodiments described below are a part, but not all, of the embodiments of the present disclosure. All of other embodiments, obtained by those skilled in the art based on the embodiments of the present disclosure without any inventive efforts, fall into the protection scope of the present disclosure.

Figure 1:
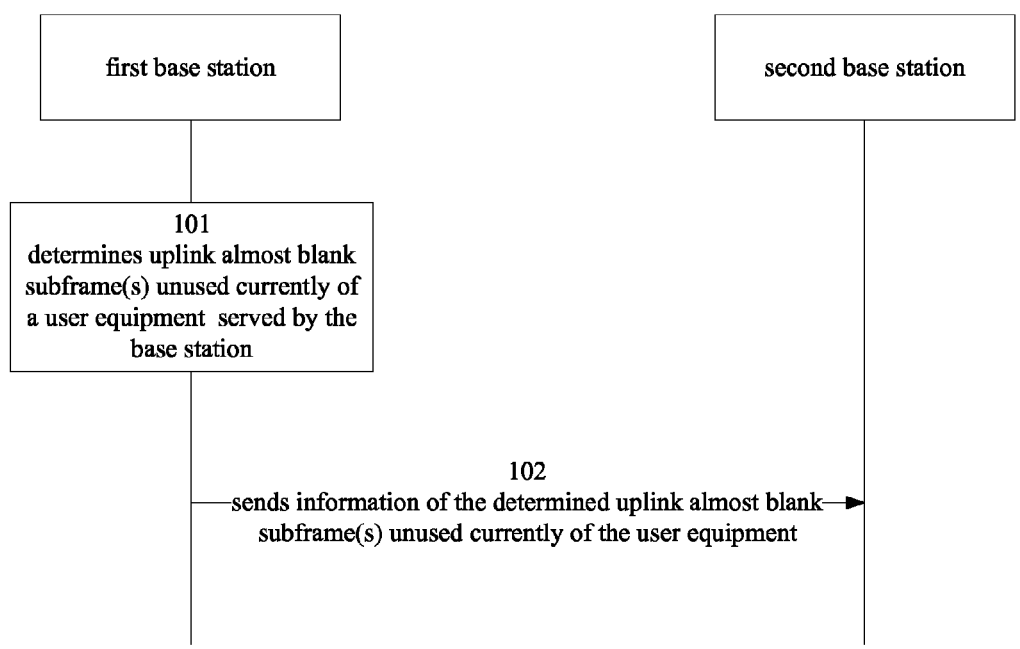
FIG. 1 is a first schematic flowchart of a method for uplink resource allocation provided by an embodiment of the present disclosure.

An embodiment of the present disclosure provides a method for uplink resource allocation, as shown in FIG. 1, including:

101. A first base station determines uplink almost blank subframe (UL ABS) subframe(s) unused currently of a user equipment (UE) served by the first base station.

The first base station determines the UL ABS subframe(s) unused currently by the UE served by the first base station in all UL ABS subframe(s) and sends information of the UL ABS subframe(s) to a second base station.

102. The first base station sends information of the determined UL ABS subframe(s) unused currently of the UE served by the first base station to the second base station, so that the second base station acquires available UL ABS subframe(s) and takes the available UL ABS subframe(s) as uplink subframe resource(s) of the second base station.

Specifically, the first base station sends pattern information of UL ABS subframe(s) to the second base station, wherein all the available UL ABS subframe(s) is identified in the pattern information of the UL ABS subframe(s); preferably, a UL ABS subframe is expressed as 1 in the pattern information, and a non-UL ABS subframe is expressed as 0 in the pattern information.

If the first base station takes all the UL ABS subframe(s) as the UL ABS subframe(s) unused currently of the UE, the first base station may also send the information of the determined UL ABS subframe(s) to the second base station in the following method.

The first base station sends pattern information of DL ABS to the second base station, wherein the pattern information of the DL ABS subframe(s) carries indication information, and the indication information is used for indicating whether the UL ABS subframe(s) is available for the second base station. Optionally, the indication information is a parameter of 1 bit. If the pattern information of the DL ABS received by the second base station carries the parameter of 1 bit, the second base station learns that all the UL ABS subframe(s) is available.

According to the method for uplink resource allocation provided by the embodiment of the present disclosure, the first base station determines the UL ABS subframe(s) unused currently of the UE served by the first base station in all the UL ABS subframe(s), and sends the information of the determined UL ABS subframe(s) unused currently of the UE served by the first base station to the second base station, so that the second base station acquires the available UL ABS subframe(s). When the second base station and a user equipment (UE) served by the second base station use the UL ABS subframe(s), it may be ensured that no instruction information is sent by the first base station and the UE served by the first base station in the above-mentioned UL ABS subframe(s), thereby further reducing interference of service transmission between cell uplinks.

Figure 2:
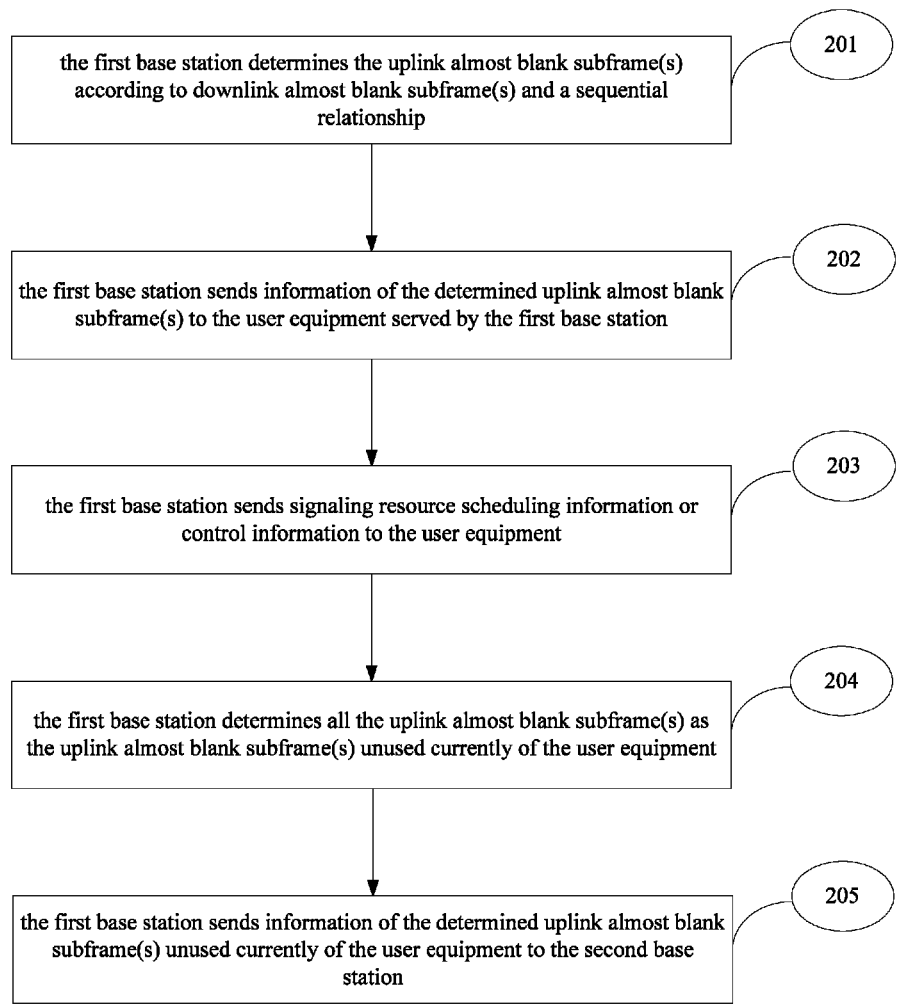
FIG. 2 is a second schematic flowchart of a method for uplink resource allocation provided by an embodiment of the present disclosure.

An embodiment of the present disclosure provides a method for uplink resource allocation, as shown in FIG. 2, the method is applicable when a first base station takes all UL ABS subframe(s) as UL ABS subframe(s) unused currently of a UE, and specifically includes:

201. The first base station determines the UL ABS subframe(s) according to downlink almost blank subframe (DL ABS) subframe(s) and a sequential relationship.

The first base station may determine the UL ABS subframe(s) by means of the DL ABS subframe(s) and the sequential relationship, such as a HARQ (Hybrid Automatic Repeat Request) sequential relationship. For example, in FDD (Frequency Division Duplexing), if subframe n is a DL ABS subframe, it may be derived that subframe n+4 is a UL ABS subframe.

202. The first base station sends information of the determined UL ABS subframe(s) to the UE served by the first base station.

203. The first base station sends signaling resource scheduling information or control information to the UE, so that the UE processes instruction information according to the signaling resource scheduling information or the control information, wherein the signaling resource scheduling information is used for instructing the UE to schedule a piece of information using the UL ABS subframe(s) in the instruction information in idle uplink subframe(s) except the UL ABS subframe(s) for sending, and the control information is used for instructing the UE not to send a piece of information using the UL ABS subframe(s) in the instruction information.

Specifically, uplink subframe(s) used by the UE to send control signaling and/or data to the first base station is allocated by the first base station. The first base station adjusts the uplink subframe(s) allocated to the UE, so that the UE adjusts a piece of instruction information originally sent in UL ABS subframe(s) to be sent in newly allocated idle uplink subframe(s) except the UL ABS subframe(s), with a piece of instruction information in other subframe(s) being normally sent, and sends the signaling resource scheduling information to notify the UE to schedule a piece of information using the UL ABS subframe(s) in the instruction information in the idle uplink subframe(s) except the UL ABS subframe(s) for sending. After receiving the signaling resource scheduling information, the UE adjusts the piece of information originally sent in the UL ABS subframe(s) in the instruction information to be sent in the idle uplink subframe(s) except the UL ABS subframe(s) reallocated by the first base station.

It should be noted that the instruction information is signaling actively sent by the UE to the first base station, such as RACH (Random Access Channel) signaling, or may be other signaling, which is not limited in the present disclosure.

For example, in pattern information of the DL ABS subframe(s) and the UL ABS subframe(s), 1 expresses a DL ABS subframe or a UL ABS subframe, 0 expresses a non-DL ABS subframe or a non-UL ABS subframe, and the sequential relationship between the DL ABS subframe and the UL ABS subframe is the same as that in FDD, namely, if a DL ABS subframe is n, n+4 expresses a UL ABS subframe.

If a pattern of DL ABS subframes is:
01000, 00001, 00000, 00100, 00000, 10000, 00010, 00000;
according to the pattern of the DL ABS subframes, it may be derived that a standard pattern of UL ABS subframes is:
00000, 10000, 00010, 00000, 01000, 00001, 00000, 00100.

In a practical communication process, the first base station may allocate to the UE a part of the UL ABS subframes for use, and a pattern of UL ABS subframes unused currently is:
00000, 00000, 00010, 00000, 00000, 00001, 00000, 00000.

According to the above-mentioned method, the first base station adjusts the uplink subframes allocated to the UE for sending the instruction information, and adjusts the piece of instruction information sent in the UL ABS subframes originally allocated to the UE to be sent in newly allocated idle uplink subframes except the UL ABS subframes, so that no information is sent in the UL ABS subframes.

Or, in order to use all the UL ABS subframes as uplink resources of the second base station, the first base station sends control information to the UE, to notify the UE not to send the piece of information using the UL ABS subframes in the instruction information and normally send the piece of information using other uplink subframes. After receiving the control information, the UE may not send the piece of information using the UL ABS subframes, so that a currently unused pattern of the UL ABS subframes is consistent with the standard pattern of the UL ABS subframes.

It should be noted that, it may also be specified in a protocol text that second UL ABS subframes determined by the second base station according to information of DL ABS subframes sent by the first base station are all available. At this time, the first base station may realize that the UE served by the first base station does not use all the UL ABS subframes by the step 203.

204. The first base station determines all the UL ABS subframe(s) as the UL ABS subframe(s) unused currently of the UE.

By means of the above-mentioned method, the first base station ensures that no information is sent in all the UL ABS subframe(s), namely, the UE served by the first base station uses no UL ABS subframe currently, and the first base station takes all the UL ABS subframe(s) as the UL ABS subframe(s) unused currently of the UE.

205. The first base station sends information of the determined UL ABS subframe(s) unused currently of the UE to the second base station, so that the second base station acquires available UL ABS subframe(s) and takes the available UL ABS subframe(s) as uplink subframe resource(s) of the second base station.

Specifically, the first base station sends pattern information of UL ABS subframe(s) to the second base station, wherein all the available UL ABS subframe(s) is identified in the pattern information of the UL ABS subframe(s); preferably, a UL ABS subframe is expressed as 1 in the pattern information, and a non-UL ABS subframe is expressed as 0 in the pattern information.

Or, the first base station sends pattern information of DL ABS to the second base station, wherein the pattern information of the DL ABS subframe(s) carries indication information, and the indication information is used for indicating whether the UL ABS subframe(s) is available for the second base station. Optionally, the indication information is a parameter of 1 bit. If the pattern information of the DL ABS received by the second base station carries the parameter of 1 bit, the second base station learns that all the UL ABS subframe(s) is available.

Figure 3:
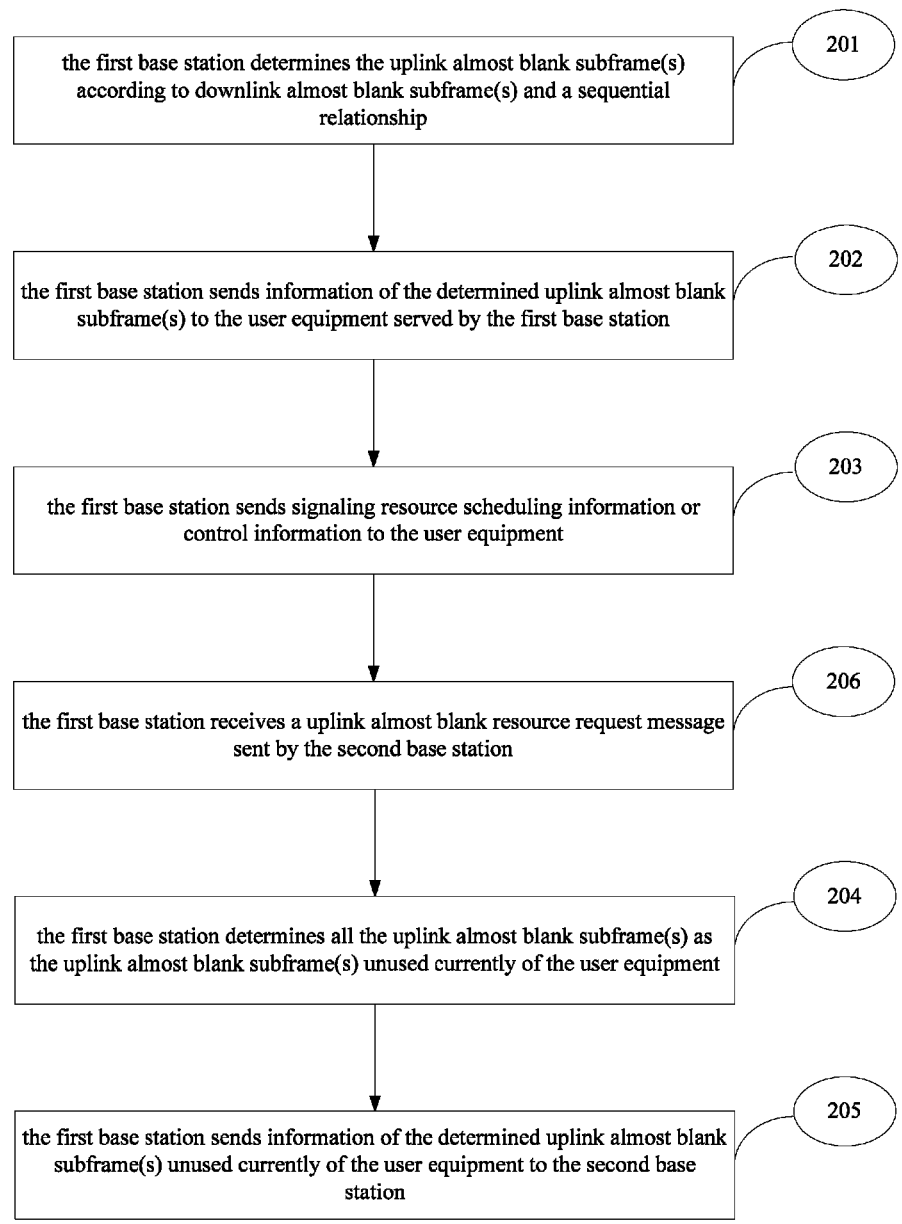
FIG. 3 is a third schematic flowchart of a method for uplink resource allocation provided by an embodiment of the present disclosure.

The above-mentioned method, as shown in FIG. 3, before the step 204, further includes:

206. The first base station receives a UL ABS resource request message sent by the second base station.

Specifically, before the step 204, the first base station receives the UL ABS resource request message sent by the second base station. Preferably, the UL ABS resource request message is contained in a request indication message, and the request indication message is a message sent by the second base station to the first base station for requesting DL ABS subframe(s) of the first base station.

According to the method for uplink resource allocation provided by the embodiment of the present disclosure, the first base station selects all the UL ABS subframe(s) as the uplink subframe resource(s) of the second base station, and sends the information of the UL ABS subframe(s) of the allocated uplink resource(s) of the second base station to the second base station, so that the second base station acquires the available UL ABS subframe(s). When the second base station and a user equipment (UE) served by the second base station use the UL ABS subframe(s), it may be ensured that no instruction information is sent by the first base station and the UE served by the first base station in the above-mentioned UL ABS subframe(s), thereby further reducing interference of service transmission between cell uplinks.

Figure 4:
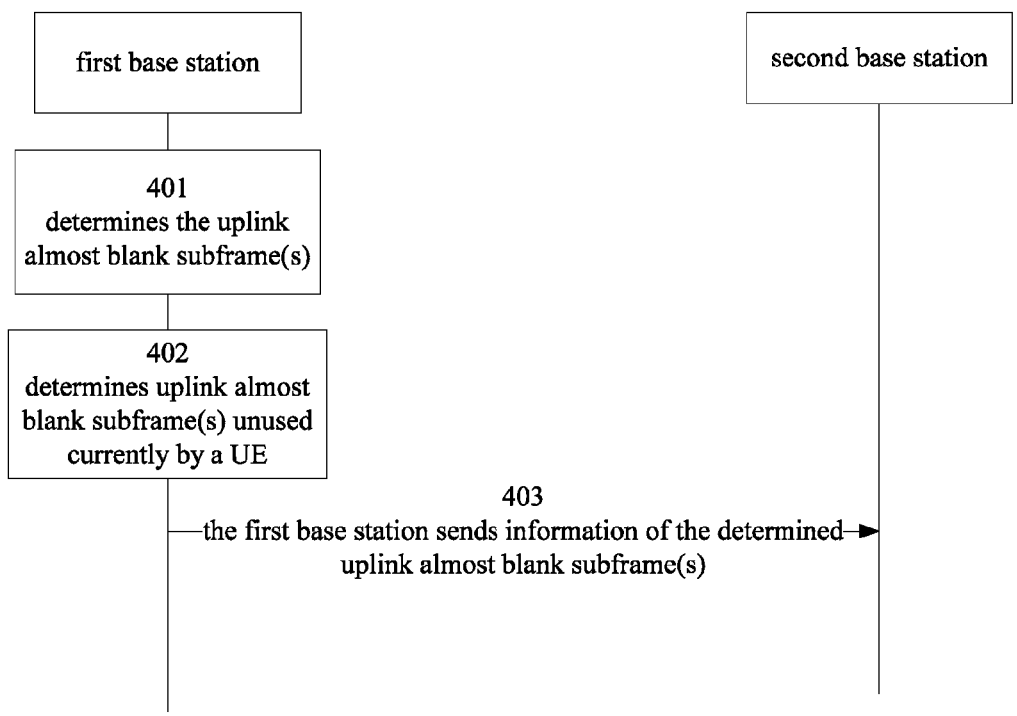
FIG. 4 is a fourth schematic flowchart of a method for uplink resource allocation provided by an embodiment of the present disclosure.

An embodiment of the present disclosure provides a method for uplink resource allocation, as shown in FIG. 4, the method is applicable when a first base station takes a part of UL ABS subframe(s) as uplink resource(s) of a second base station, and specifically includes:

401. The first base station determines the uplink almost blank subframe (UL ABS) subframe(s) according to downlink almost blank subframe(s) DL ABS subframe(s) and a sequential relationship.

Specifically, the first base station may derive the UL ABS subframe(s) according to the DL ABS subframe(s) and the sequential relationship, such as a HARQ (Hybrid Automatic Repeat Request) sequential relationship. For example, in FDD (Frequency Division Duplexing), if subframe n is a DL ABS subframe, it may be derived that subframe n+4 is a UL ABS subframe.

402. The first base station determines UL ABS subframe(s) unused currently of a user equipment (UE) served by the first base station.

The first base station determines the UL ABS subframe(s) unused currently of the UE served by the first base station in the UL ABS subframe(s) determined in the step 401.

Specifically, the first base station determines the UL ABS subframe(s) unused currently of the UE served by the first base station in the determined UL ABS subframe(s) in two methods.

Method 1: the first base station takes UL ABS subframe(s) unallocated currently to the UE served by the first base station in the UL ABS subframe(s) determined in the step 401 as the UL ABS subframe(s) unused currently of the UE.

For example, in pattern information of the DL ABS subframe(s) and the UL ABS subframe(s), 1 expresses a DL ABS subframe or a UL ABS subframe, 0 expresses a non-DL ABS subframe or a non-UL ABS subframe, and the sequential relationship between the DL ABS subframe and the UL ABS subframe is the same as that in FDD, namely, if a DL ABS subframe is n, n+4 expresses a UL ABS subframe.

If a pattern of DL ABS subframes is:
01000, 00001, 00000, 00100, 00000, 10000, 00010, 00000;

according to the pattern of the DL ABS subframes, it may be derived that a standard pattern of UL ABS subframes is:
00000, 10000, 00010, 00000, 01000, 00001, 00000, 00100.

In a practical communication process, the first base station may allocate to the UE a part of the UL ABS subframes for use, and a pattern of UL ABS subframes unused currently is:
00000, 00000, 00010, 00000, 00000, 00001, 00000, 00000.

According to the above-mentioned method, UL ABS subframes unallocated to the UE for use are taken as the UL ABS subframes unused currently of the UE, namely, information of the UL ABS subframes expressed by the pattern, 00000, 00000, 00010, 00000, 00000, 00001, 00000, 00000, of the UL ABS subframes unallocated to the UE for use is sent to the second base station, so that the second base station acquires available UL ABS subframes.

Method 2: the first base station adjusts a part of UL ABS subframe(s) allocated to the UE for use in the UL ABS subframe(s) determined in the step 401 into idle UL ABS subframe(s), and takes idle UL ABS subframe(s) as the UL ABS subframe(s) unused currently of the UE.

According to the above-mentioned example, in a practical communication process, the first base station may allocate to the UE a part of UL ABS subframes for use, and a pattern of UL ABS subframes unallocated to the UE for use is:
00000, 00000, 00010, 00000, 00000, 00001, 00000, 00000.

According to the above-mentioned method, the first base station adjusts a part of UL ABS subframes allocated to the UE for use into idle UL ABS subframes, and takes idle UL ABS subframes as UL ABS subframes unused currently of the UE. Preferably, UL ABS subframes allocated to the second base station for use have a sequential relationship with DL ABS subframes used by the second base station.

For example, the first base station adjusts a part of the UL ABS subframes allocated to the UE for use into the idle UL ABS subframes, and a pattern is:
00000, 10000, 00010, 00000, 01000, 00001, 00000, 00000.

403. The first base station sends information of the determined UL ABS subframe(s) unused currently of the UE to the second base station, so that the second base station acquires available UL ABS subframe(s) and takes the available UL ABS subframe(s) as uplink subframe resource(s) of the second base station.

Specifically, the first base station sends pattern information of UL ABS subframe(s) to the second base station, wherein all the available UL ABS subframe(s) is identified in the pattern information of the UL ABS subframe(s); preferably, a UL ABS subframe is expressed as 1 in the pattern information, and a non-UL ABS subframe is expressed as 0 in the pattern information.

Figure 5:
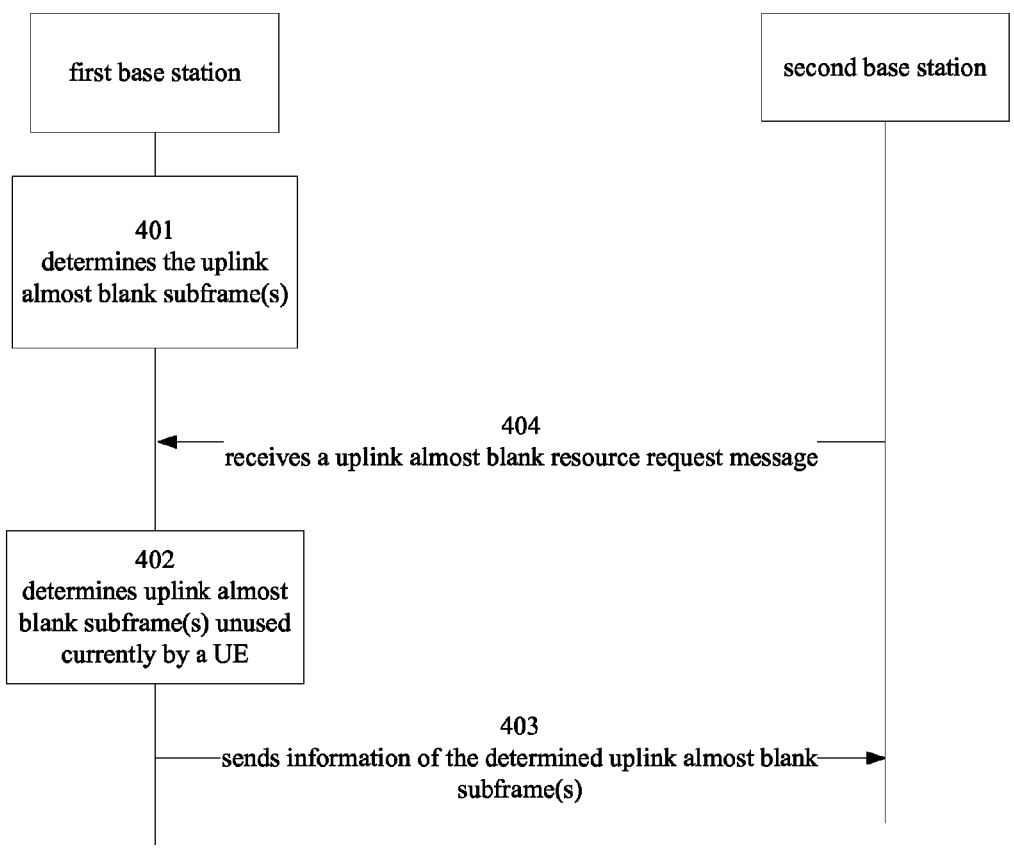
FIG. 5 is a fifth schematic flowchart of a method for uplink resource allocation provided by an embodiment of the present disclosure.

The above-mentioned method, as shown in FIG. 5, before the step 402, further includes:

404. The first base station receives a UL ABS resource request message sent by the second base station.

The first base station receives the UL ABS resource request message sent by the second base station. Preferably, the UL ABS resource request message is contained in a request indication message, and the request indication message is a message sent by the second base station to the first base station for requesting DL ABS subframe(s) of the first base station.

Figure 6:
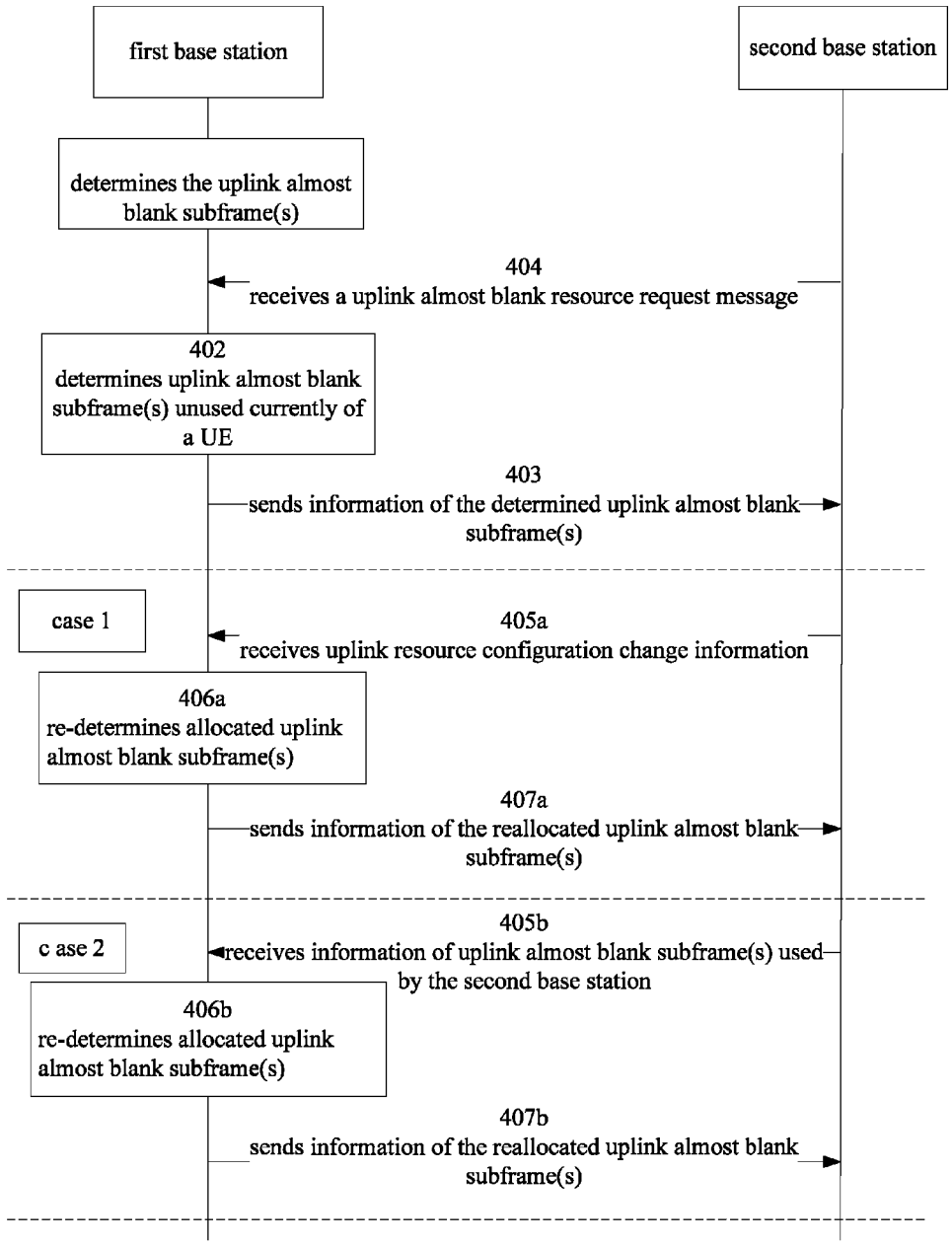
FIG. 6 is a sixth schematic flowchart of a method for uplink resource allocation provided by an embodiment of the present disclosure.

The above-mentioned method, as shown in FIG. 6, after the step 403, further includes:

the following two cases according to different information fed back by the second base station, wherein the first case is steps 405a-407a; and the second case is steps 405b-407b.

405a. The first base station receives uplink (UL) resource configuration change information sent by the second base station.

Specifically, after the step 403, the first base station receives the UL resource configuration change information sent by the second base station, preferably, the resource configuration change information carries pattern information of UL ABS subframe(s) recommended by the second base station and/or suggestion information of uplink subframe resource allocation. The suggestion information may be suggesting the first base station to increase UL ABS subframe(s) allocated to the second base station, or suggesting the first base station to decrease UL ABS subframe(s) allocated to the second base station.

406a. The first base station re-determines UL ABS subframe(s) allocated to the second base station and serving as the uplink subframe resource(s) of the second base station according to the received UL resource configuration change information.

Specifically, the first base station re-adjusts and re-determines the UL ABS subframe(s) allocated to the second base station and serving as the uplink subframe resource(s) of the second base station according to the received UL resource configuration change information, to enable the UL ABS subframe(s) allocated to the second base station after adjusting to meet requirements of the second base station.

407a. information of the UL ABS subframe(s) reallocated to the second base station is sent to the second base station.

405b. The first base station receives information of UL ABS subframe(s) used by the second base station sent by the second base station.

Specifically, the information of the UL ABS subframe(s) used by the second base station includes a percentage of the used UL ABS and pattern information of the used UL ABS subframe(s). Preferably, when receiving the information of the UL ABS subframe(s) used by the second base station sent by the second base station, the first base station also receives information of DL ABS subframe(s) used by the second base station sent by the second base station. The information of the DL ABS subframe(s) includes a percentage of the used DL ABS and pattern information of the used DL ABS subframe(s).

406b. The first base station re-determines UL ABS subframe(s) allocated to the second base station and serving as the uplink subframe resource(s) of the second base station according to the information of the UL ABS subframe(s) used by the second base station.

Specifically, the first base station re-determines the UL ABS subframe(s) allocated to the second base station and serving as the uplink subframe resource(s) of the second base station according to the received information of the UL ABS subframe(s) used by the second base station, namely, according to the received percentage of the UL ABS used by the second base station and the pattern information of the used UL ABS, so as to improve the percentage of the UL ABS subframe(s) used by the second base station.

407b. information of the UL ABS subframe(s) reallocated to the second base station is sent to the second base station.

Figure 7:
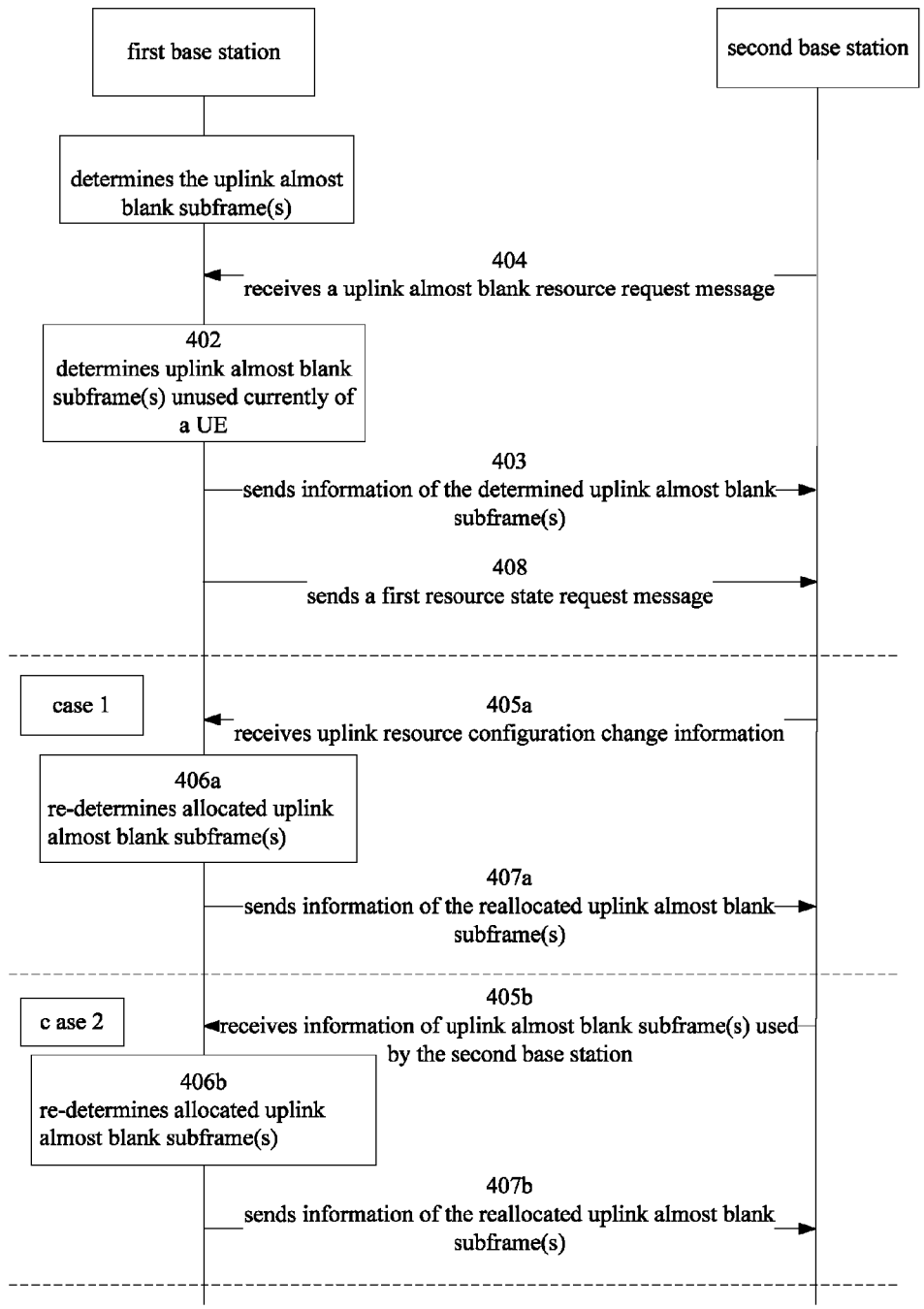
FIG. 7 is a seventh schematic flowchart of a method for uplink resource allocation provided by an embodiment of the present disclosure.

The above-mentioned method, as shown in FIG. 7, further includes:

408. The first base station sends a first resource state request message to the second base station to obtain use condition information of the UL ABS subframe(s) of the second base station.

Specifically, before the step 405a or 405b, in order to obtain the use condition information of the UL ABS subframe(s) of the second base station, the first base station sends the first resource state request message to the second base station.

According to the method for uplink resource allocation provided by the embodiment of the present disclosure, after determining the uplink UL ABS subframe(s), the first base station determines the UL ABS subframe(s) unused currently by the UE and sends the information of the determined UL ABS subframe(s) unused by the UE to the second base station, so that the second base station acquires the available UL ABS subframe(s). In this way, when the second base station and a user equipment (UE) served by the second base station use the UL ABS subframe(s), it may be ensured that no instruction information is sent by the first base station and the UE served by the first base station in the above-mentioned UL ABS subframe(s), thereby further reducing interference of service transmission between cell uplinks.

Figure 8:
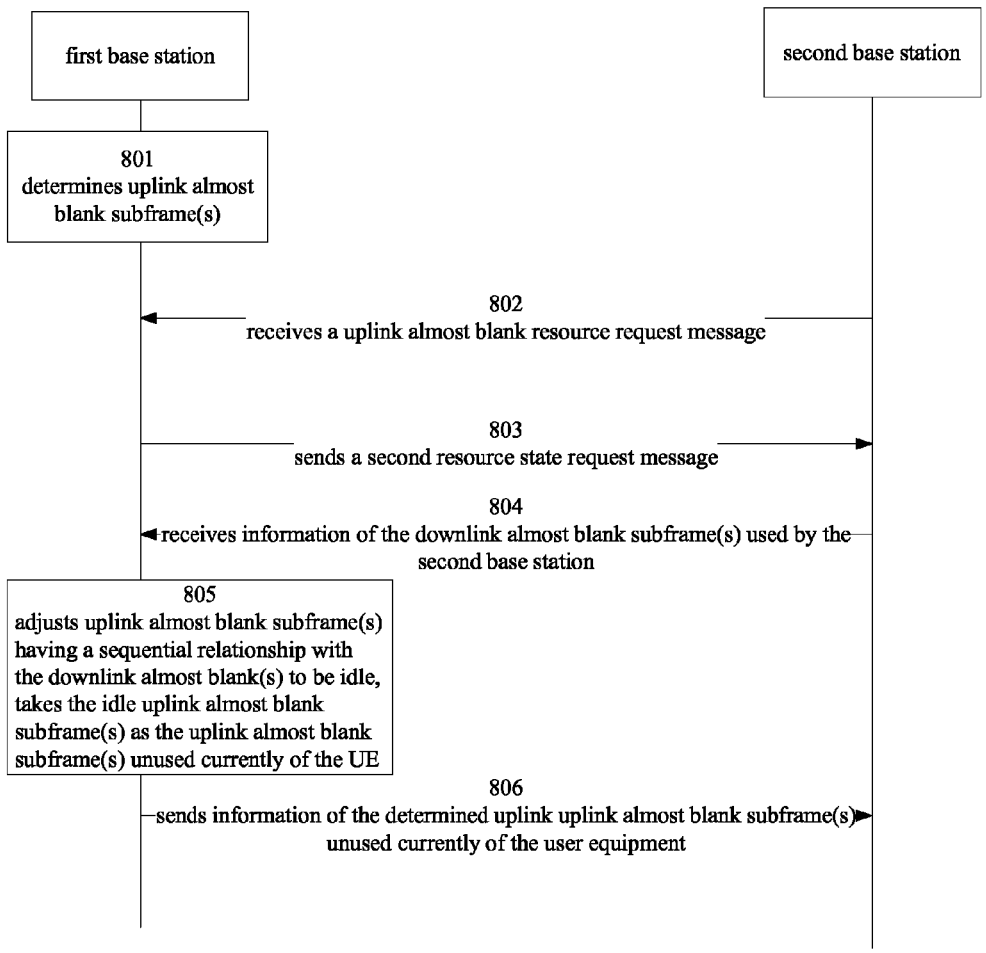
FIG. 8 is an eighth schematic flowchart of a method for uplink resource allocation provided by an embodiment of the present disclosure.

An embodiment of the present disclosure further provides a method for uplink resource allocation, as shown in FIG. 8, the method is applicable when a first base station determines UL ABS subframe(s) as UL ABS subframe(s) unused currently of a UE according to use condition information of DL ABS subframe(s) fed back by a second base station, and specifically includes:

801. The first base station determines UL ABS subframe(s) according to DL ABS subframe(s) and a sequential relationship.

Specifically, the first base station may determine the UL ABS subframe(s) according to the DL ABS subframe(s) and the sequential relationship, such as a HARQ sequential relationship. For example, in FDD, if subframe n is a DL ABS subframe, it may be derived that subframe n+4 is a UL ABS subframe.

802. The first base station receives a UL ABS resource request message sent by the second base station.

Specifically, the first base station receives the UL ABS resource request message sent by the second base station. Preferably, the UL ABS resource request message is sent to the first base station contained in a request indication message. The request indication message is a message sent by the second base station to the first base station for requesting DL ABS subframe(s) of the first base station.

803. The first base station sends a second resource state request message to the second base station to obtain use condition information of DL ABS subframe(s) of the second base station.

Specifically, after receiving the UL ABS resource request message, the first base station sends the second resource state request message to the second base station, for obtaining the use condition information of the DL ABS subframe(s) of the second base station.

804. The first base station receives information of the DL ABS subframe(s) used by the second base station sent by the second base station.

Specifically, after sending the second resource state request message to the second base station, the first base station may receive the information of the DL ABS subframe(s) used by the second base station fed back by the second base station. The information of the DL ABS subframe(s) includes a percentage of the used DL ABS subframe(s) and pattern information of the used DL ABS subframe(s).

805. The first base station adjusts UL ABS subframe(s) having a sequential relationship with the used DL ABS(s) to be idle according to the received information of the DL ABS subframe(s) used by the second base station, and takes the idle UL ABS subframe(s) as the UL ABS subframe(s) unused currently of the UE.

Specifically, the first base station adjusts a part of UL ABS subframe(s) allocated to the UE for use in all the UL ABS subframe(s) according to the received information of the DL ABS subframe(s) used by the second base station, namely, the percentage of the DL ABS subframe(s) used by the second base station and the pattern information of the used DL ABS subframe(s), so as to adjust the UL ABS subframe(s) meeting the sequential relationship with the DL ABS subframe(s) used by the second base station to be idle, and take the idle UL ABS subframe(s) as the uplink UL ABS subframe(s) unused currently of the UE.

806. The first base station sends information of the determined uplink UL ABS subframe(s) unused currently of the UE to the second base station, so that the second base station acquires available UL ABS subframe(s) and takes the available UL ABS subframe(s) as uplink subframe resource(s) of the second base station.

Specifically, the first base station sends pattern information of UL ABS subframe(s) to the second base station, wherein all the available UL ABS subframe(s) is identified in the pattern information of the UL ABS subframe(s); preferably, a UL ABS subframe is expressed as 1 in the pattern information, and a non-UL ABS subframe is expressed as 0 in the pattern information.

According to the method for uplink resource allocation provided by the embodiment of the present disclosure, the first base station determines, in all the UL ABS subframe(s), the UL ABS subframe(s) unused currently by UE served by the first base station and meeting the sequential relationship with the DL ABS subframe(s) of the second base station, and sends the information of the determined UL ABS subframe(s) to the second base station, so that the second base station acquires the available UL ABS subframe(s). In this way, when the second base station and a UE served by the second base station use the UL ABS subframe(s), it may be ensured that no instruction information is sent by the first base station and the UE served by the first base station in the above-mentioned UL ABS subframe(s), thereby further reducing interference of service transmission between cell uplinks.

Figure 9:
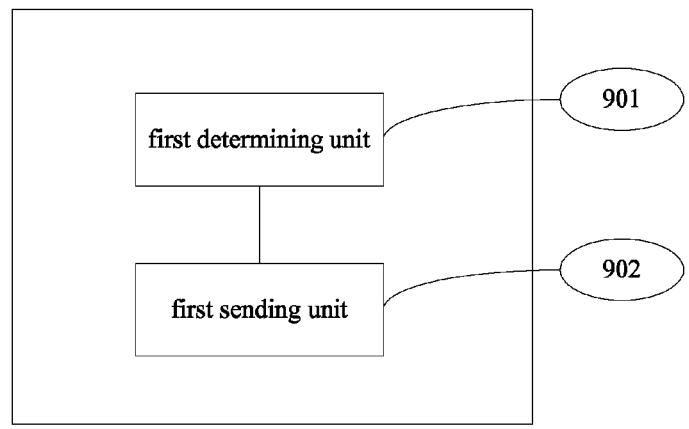
FIG. 9 is a first schematic diagram of a structure of a base station provided by an embodiment of the present disclosure.

Corresponding to the above-mentioned method, an embodiment of the present disclosure provides a base station, as shown in FIG. 9, including:

a first determining unit 901, configured to determine uplink almost blank subframe (UL ABS) subframe(s) unused currently of a user equipment (UE) served by the base station; and a first sending unit 902, configured to send information of the UL ABS subframe(s) unused currently of the UE determined by the first determining unit 901 to a second base station, so that the second base station acquires available UL ABS subframe(s) and takes the available UL ABS subframe(s) as uplink subframe resource(s) of the second base station.

Specifically, pattern information of the UL ABS subframe(s) is sent to the second base station, and all the available UL ABS subframe(s) is identified in the pattern information of the UL ABS subframe(s).

Or, when the first determining unit 901 takes all UL ABS subframe(s) as the uplink subframe resource(s) of the second base station, pattern information of DL ABS is sent to the second base station, wherein the pattern information of the DL ABS carries indication information, and the indication information is used for indicating whether the UL ABS subframe(s) is available for the second base station.

Figure 10:
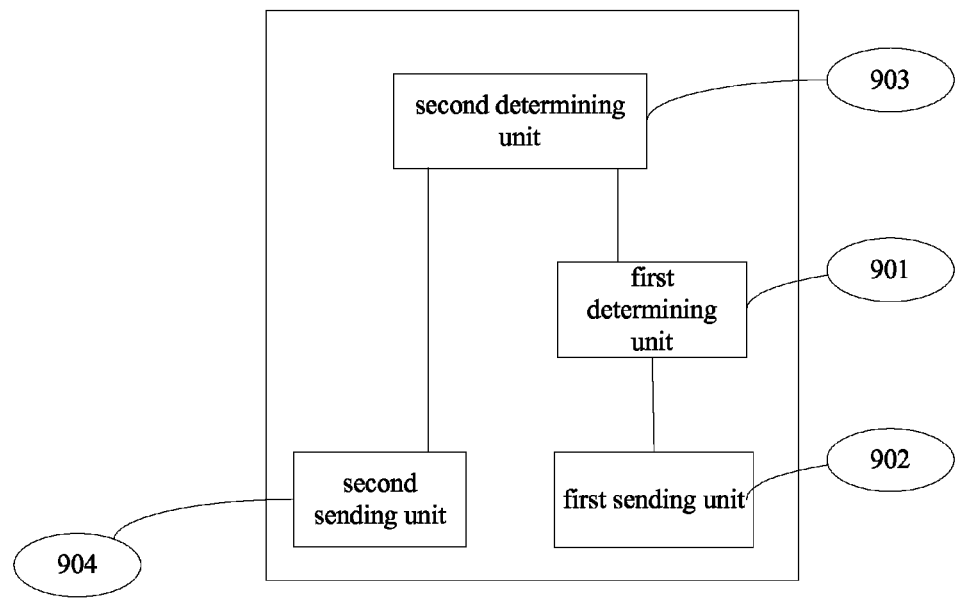
FIG. 10 is a second schematic diagram of a structure of a base station provided by an embodiment of the present disclosure.

The base station, as shown in FIG. 10, further includes a second determining unit 903 and a second sending unit 904.

The first determining unit 901 is specifically configured to determine all UL ABS subframe(s) as the unused UL ABS subframe(s) of the UE for a the first base station.

The second determining unit 903 is configured to derive the UL ABS subframe(s) according to downlink almost blank subframe (DL ABS) subframe(s) and a sequential relationship.

The second sending unit 904 is configured to send information of the UL ABS subframe(s) determined by the second determining unit 903 to the user equipment (UE) served by the base station.

The second sending unit 904 is further configured to send signaling resource scheduling information or control information to the UE, so that the UE processes instruction information according to the signaling resource scheduling information or the control information; wherein the signaling resource scheduling information is used for instructing the UE to schedule a piece of information using the UL ABS subframe(s) in the instruction information in idle uplink subframe(s) except the UL ABS subframe(s) for sending; and the control information is used for instructing the UE not to send a piece of information using the UL ABS subframe(s) in the instruction information.

Figure 11:
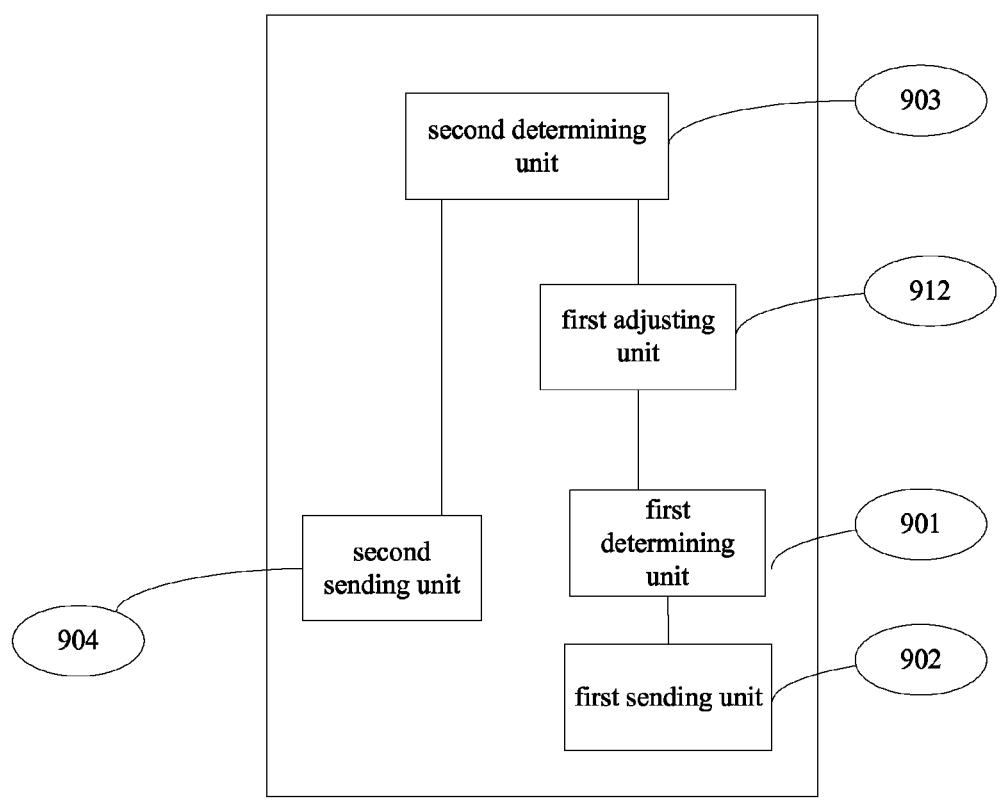
FIG. 11 is a third schematic diagram of a structure of a base station provided by an embodiment of the present disclosure.

The base station, as shown in FIG. 11, further includes:

a first adjusting unit 912, configured to adjust a part of UL ABS subframe(s) allocated to the UE for use in the UL ABS subframe(s) determined by the second determining unit 903 into idle UL ABS subframe(s).

The first determining unit 901 is configured to select UL ABS subframe(s) unallocated to the UE from the UL ABS subframe(s) determined by the second determining unit 903 as the UL ABS subframe(s) unused currently of the UE, or, take the idle UL ABS subframe(s) adjusted by the first adjusting unit 912 as the UL ABS subframe(s) unused currently of the UE.

Figure 12:
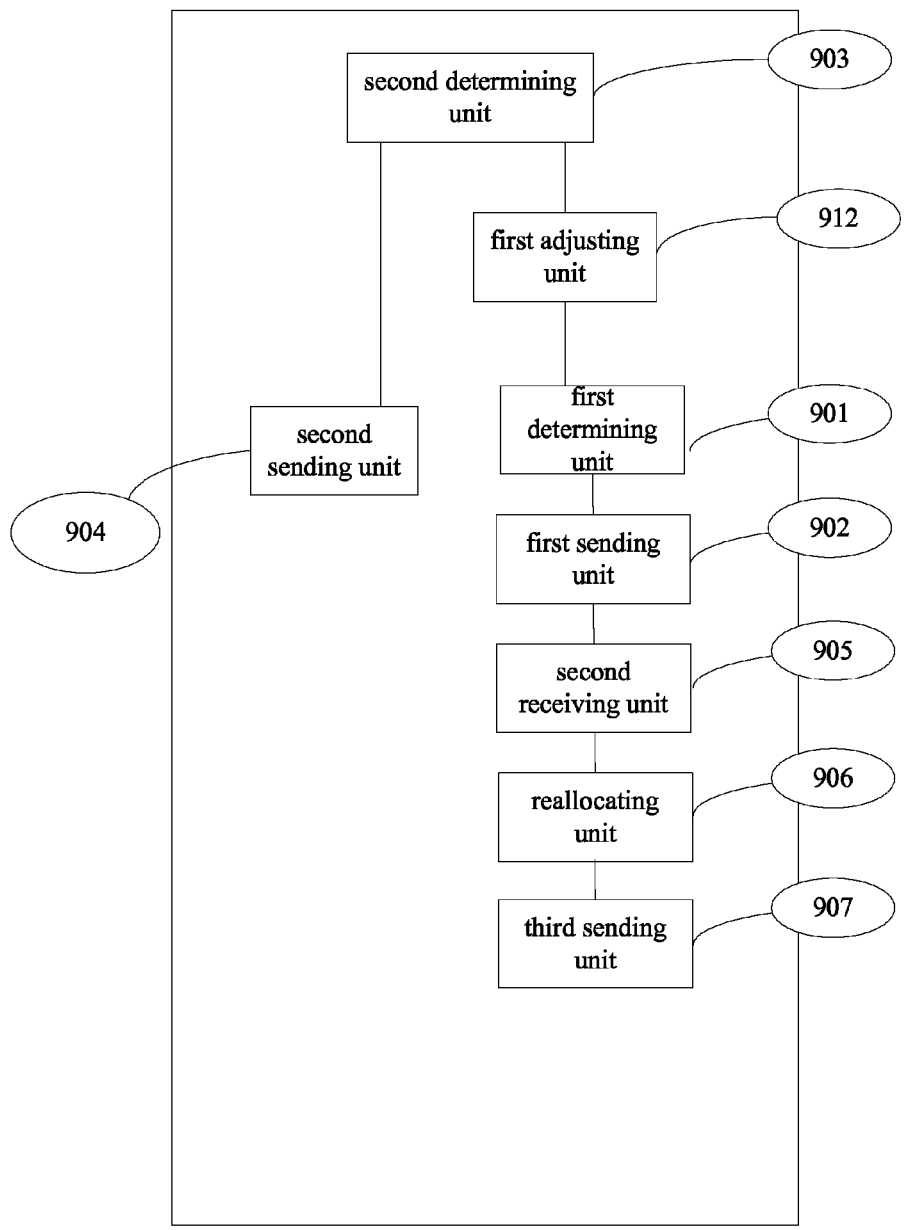
FIG. 12 is a fourth schematic diagram of a structure of a base station provided by an embodiment of the present disclosure.

The above-mentioned base station, as shown in FIG. 12, further includes: a first receiving unit 905, a reallocating unit 906 and a third sending unit 907.

The first receiving unit 905 is configured to receive uplink (UL) resource configuration change information sent by the second base station.

Preferably, the UL resource configuration change information received by the first receiving unit 905 and sent by the second base station carries pattern information of UL ABS subframe(s) recommended by the second base station and/or suggestion information of uplink subframe resource allocation.

The reallocating unit 906 is configured to re-determine UL ABS subframe(s) allocated to the second base station and serving as the uplink subframe resource(s) of the second base station according to the UL resource configuration change information received by the second receiving unit 905.

The third sending unit 907 is configured to send information of the UL ABS subframe(s) reallocated to the second base station by the reallocating unit 906 to the second base station. Or The first receiving unit 905 is configured to receive information of the UL ABS subframe(s) used by the second base station sent by the second base station.

Preferably, when receiving information of used DL ABS subframe(s) sent by the second base station, the first receiving unit 905 receives the information of the used UL ABS subframe(s) sent by the second base station.

The reallocating unit 906 is configured to re-determine UL ABS subframe(s) allocated to the second base station and serving as the uplink subframe resource(s) of the second base station according to the information of the UL ABS subframe(s) used by the second base station received by the second receiving unit 905.

The third sending unit 907 is configured to send information of the UL ABS subframe(s) allocated to the second base station re-determined by the reallocating unit 906 to the second base station.

Figure 13:
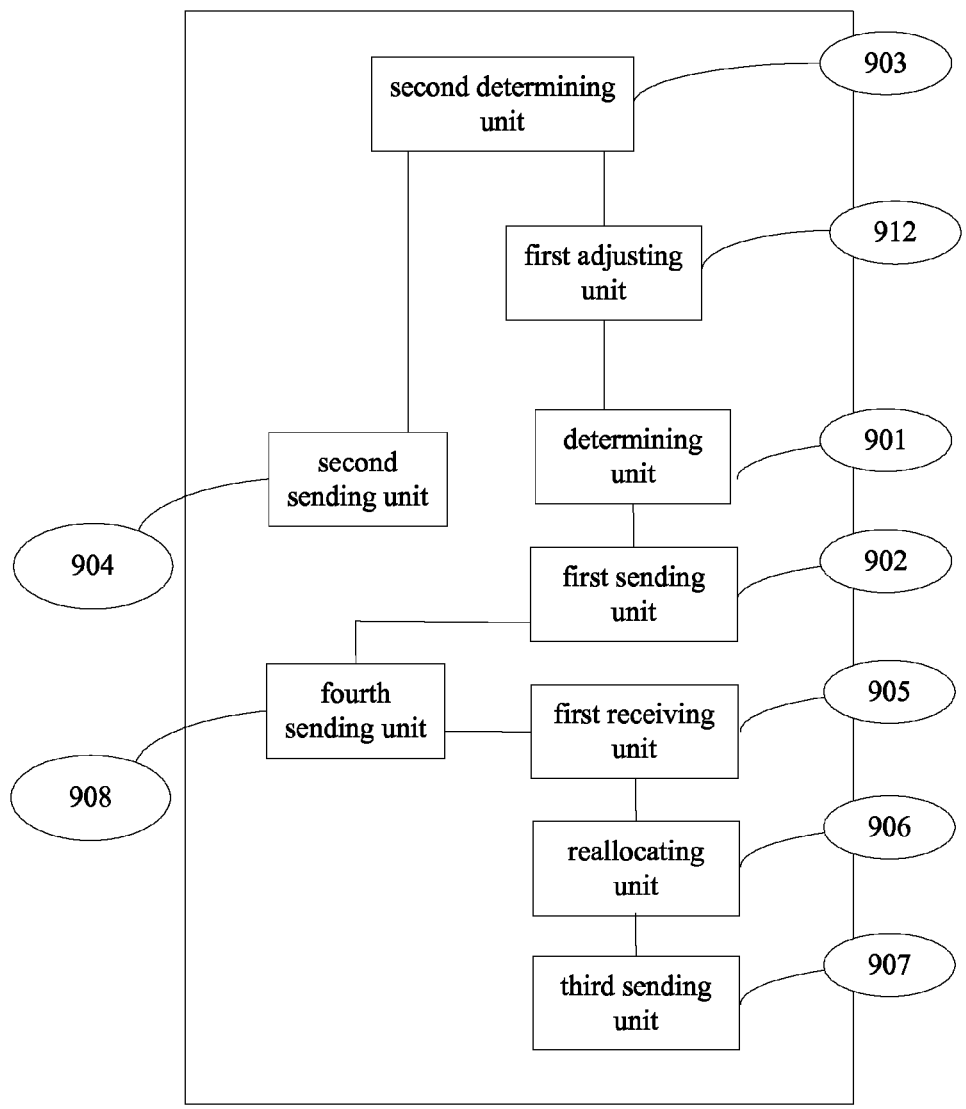
FIG. 13 is a fifth schematic diagram of a structure of a base station provided by an embodiment of the present disclosure.

The above-mentioned base station, as shown in FIG. 13, further includes:

a fourth sending unit 908, configured to send a first resource state request message to the second base station to obtain use condition information of the UL ABS subframe(s) of the second base station.

Figure 14:
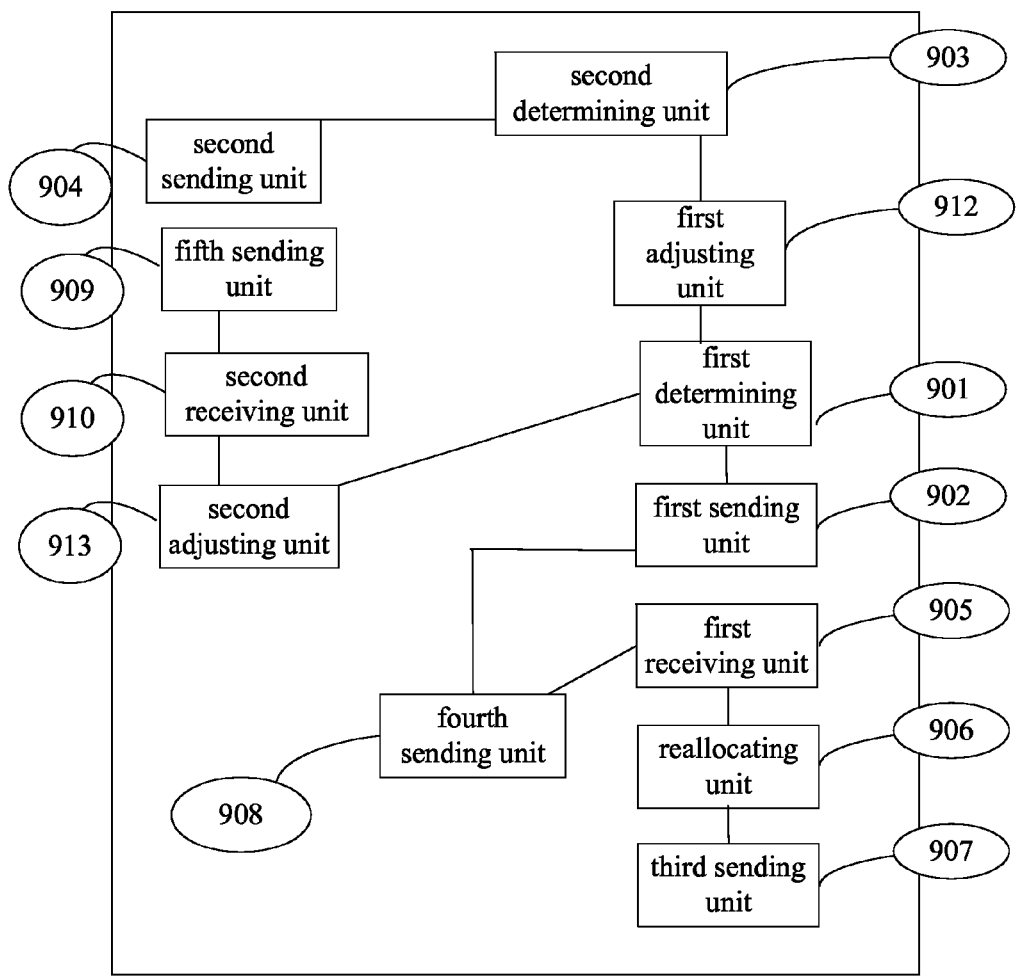
FIG. 14 is a sixth schematic diagram of a structure of a base station provided by an embodiment of the present disclosure.

The above-mentioned base station, as shown in FIG. 14, further includes: a fifth sending unit 909, a second adjusting unit 913 and a second receiving unit 910.

The fifth sending unit 909 is configured to send a second resource state request message to the second base station to obtain use condition information of DL ABS subframe(s) of the second base station.

The second receiving unit 910 is configured to receive information of the DL ABS subframe(s) used by the second base station sent by the second base station.

The second adjusting unit 913 is configured to adjust UL ABS subframe(s) having a sequential relationship with the used DL ABS subframe(s) to be idle according to the information of the DL ABS subframe(s) used by the second base station received by the second receiving unit 909.

The first determining unit 901 is configured to select the idle UL ABS subframe(s) adjusted by the second adjusting unit 913 as the UL ABS subframe(s) unused currently of the UE.

Figure 15:
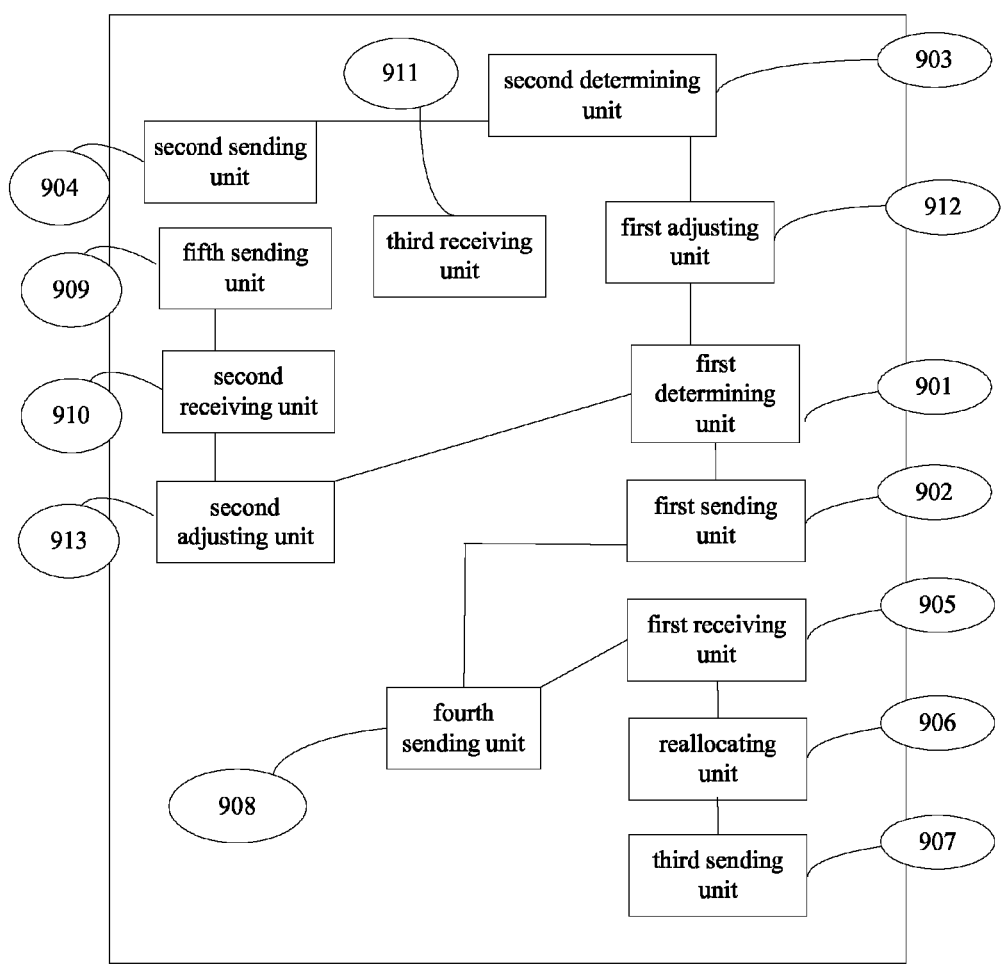
FIG. 15 is a seventh schematic diagram of a structure of a base station provided by an embodiment of the present disclosure.

The above-mentioned base station, as shown in FIG. 15, further includes:

a third receiving unit 911, configured to receive a UL ABS resource request message sent by the second base station.

The UL ABS resource request message is contained in a request indication message; and the request indication message is a message sent by the second base station to the first base station for requesting DL ABS subframe(s) of the first base station.

The embodiment of the present disclosure provides the base station, which determines the UL ABS subframe(s) unused currently by the UE, sends the information of the determined UL ABS subframe(s) to the second base station, so that the second base station acquires the available UL ABS subframe(s), and adjusts the UL ABS subframe(s) allocated to the second base station and serving as the uplink subframe resource(s) of the second base station according to the UL resource configuration change information fed back by the second base station or the information of the UL ABS subframe(s) used by the second base station, for ensuring a higher use rate of the uplink subframe resource(s) allocated to the second base station after adjusting. In this way, when the second base station and a user equipment (UE) served by the second base station use the UL ABS subframe(s), it may be ensured that no instruction information is sent by the base station and the UE served by the base station in the above-mentioned UL ABS subframe(s), thereby further reducing interference of service transmission between cell uplinks.

Figure 16:
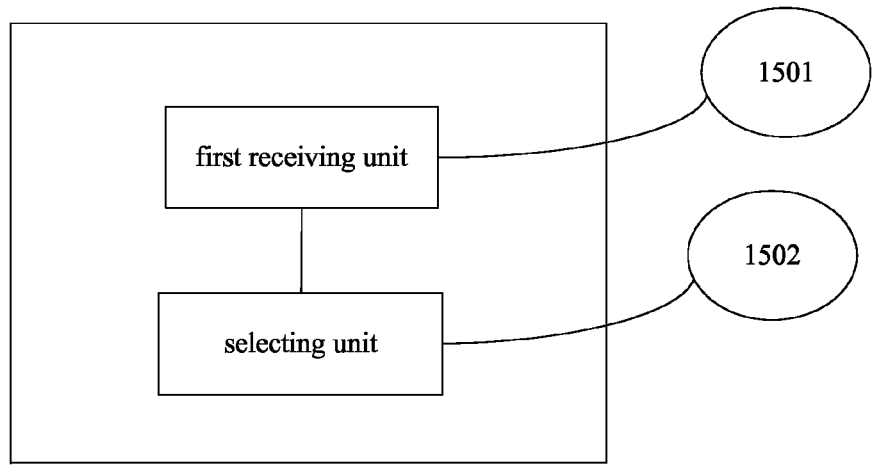
FIG. 16 is a first schematic diagram of a structure of another base station provided by an embodiment of the present disclosure.

An embodiment of the present disclosure further provides a base station, as shown in FIG. 16, including:

a first receiving unit 1501, configured to receive information of uplink almost blank subframe (UL ABS) subframe(s) and send the received information of the UL ABS subframe(s) to a selecting unit 1502; and the selecting unit 1502, configured to acquire available UL ABS subframe(s) according to the information of the UL ABS subframe(s) received by the first receiving unit 1501, and allocate the available UL ABS subframe(s) to a UE served by the base station.

Figure 17:
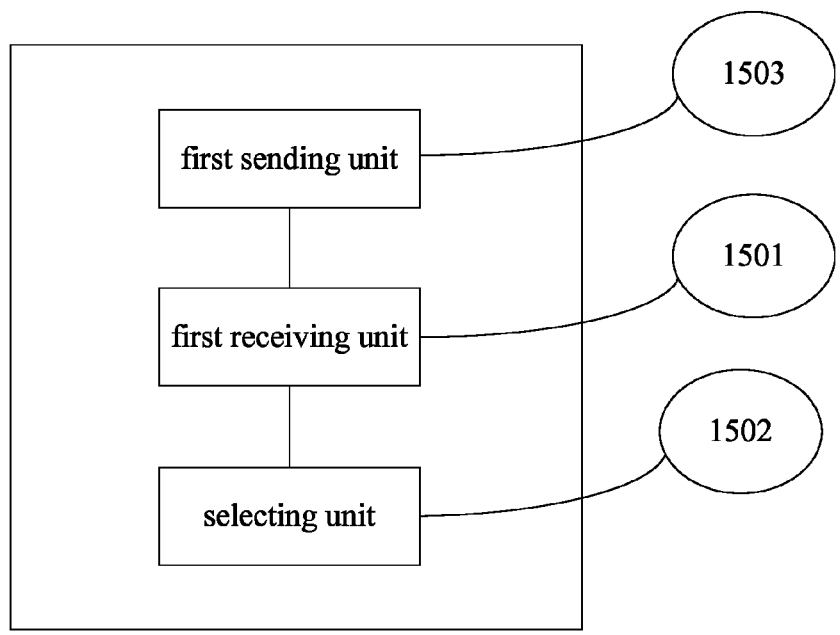
FIG. 17 is a second schematic diagram of a structure of another base station provided by an embodiment of the present disclosure.

The above-mentioned base station, as shown in FIG. 17, further includes:

a first sending unit 1503, configured to send a UL ABS resource request message to a first base station.

Figure 18:
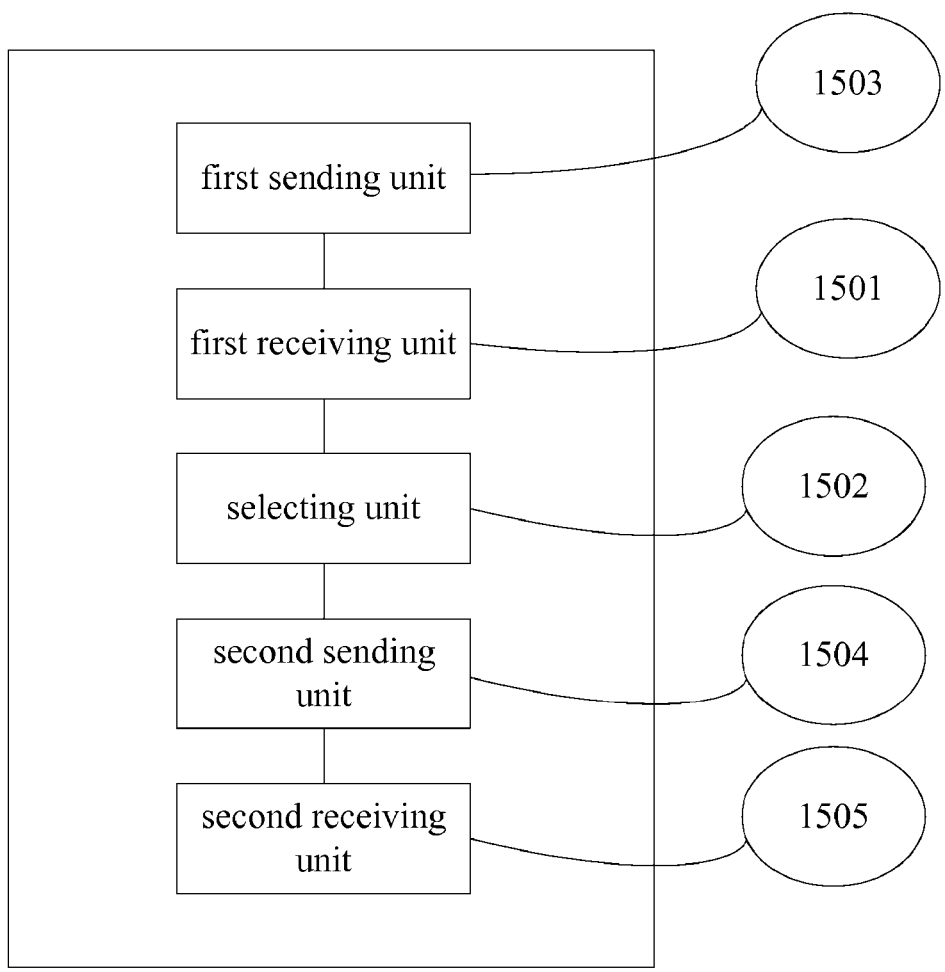
FIG. 18 is a third schematic diagram of a structure of another base station provided by an embodiment of the present disclosure.

The above-mentioned base station, as shown in FIG. 18, further includes: a second sending unit 1504 and a second receiving unit 1505.

The second sending unit 1504 is configured to send uplink (UL) resource configuration change information to the first base station, or send information of the used UL ABS subframe(s).

Preferably, the second sending unit 1504 also sends information of used DL ABS subframe(s) when sending the information of the used UL ABS subframe(s).

The second receiving unit 1505 is configured to receive information of re-determined and reallocated UL ABS subframe(s) sent by the first base station and send the updated information of the UL ABS subframe(s) to the selecting unit 1502.

Figure 19:
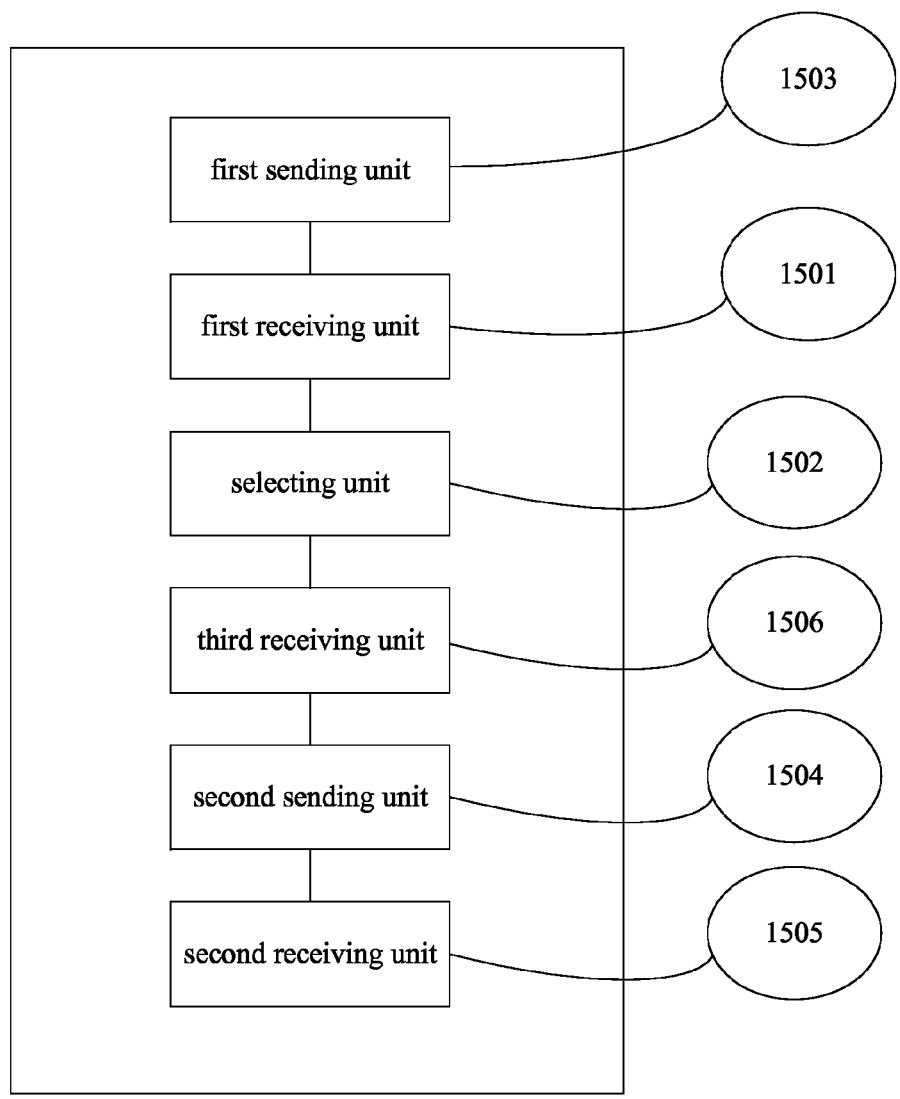
FIG. 19 is a fourth schematic diagram of a structure of another base station provided by an embodiment of the present disclosure.

The above-mentioned base station, as shown in FIG. 19, further includes:

a third receiving unit 1506, configured to receive a first resource state request message sent by the first base station.

Figure 20:
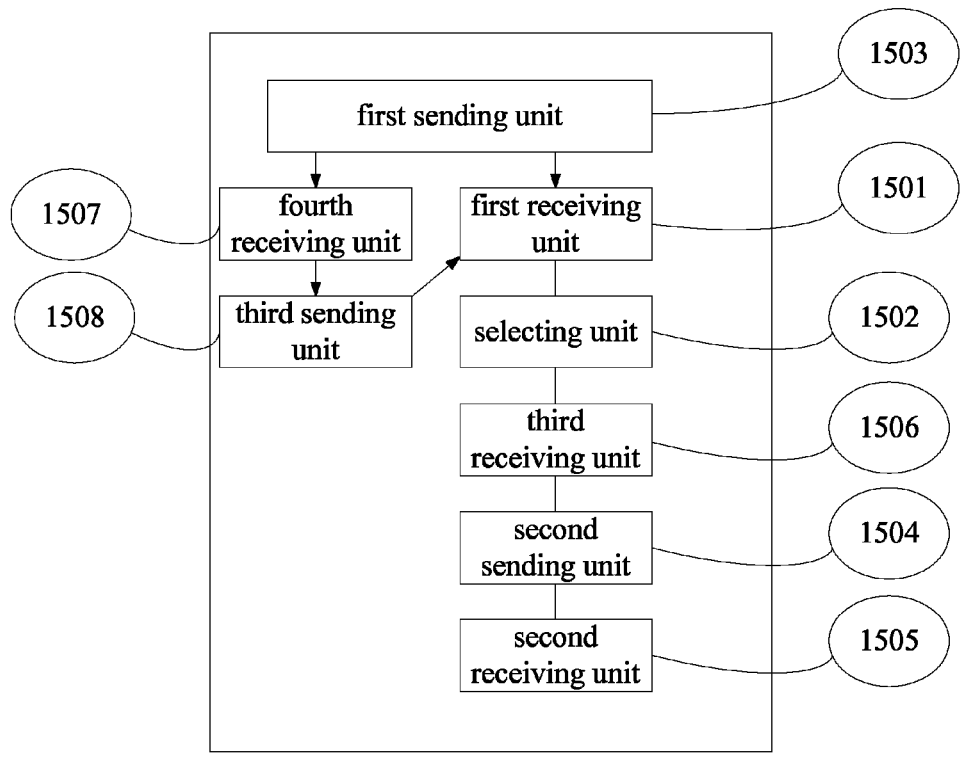
FIG. 20 is a fifth schematic diagram of a structure of another base station provided by an embodiment of the present disclosure.

The above-mentioned base station, as shown in FIG. 20, further includes: a fourth receiving unit 1507 and a third sending unit 1508.

The fourth receiving unit 1507 is configured to receive a second resource state request message.

The third sending unit 1508 is configured to send information of used DL ABS subframe(s) to the first base station.

The embodiment of the present disclosure provides the base station, which receives the information of the UL ABS subframe(s) selected by the first base station, obtains the available UL ABS subframe(s) according to the information of the selected UL ABS subframe(s) and allocates the available UL ABS subframe(s) to the UE served by the base station, and the base station also feeds back the UL resource configuration change information or the information of the used UL ABS subframe(s) to the first base station, so that the first base station re-adjust the uplink subframe resource(s)

allocated to the base station according to the feedback information of the base station, so as to ensure a higher use rate of the uplink subframe resource(s) allocated to the base station after being adjusted by the first base station. In this way, when the base station and the UE served by the base station use the UL ABS subframe(s), it may be ensured that no instruction information is sent by the first base station and the UE served by the first base station in the above-mentioned UL ABS subframe(s), thereby further reducing interference of service transmission between cell uplinks.

Figure 21:
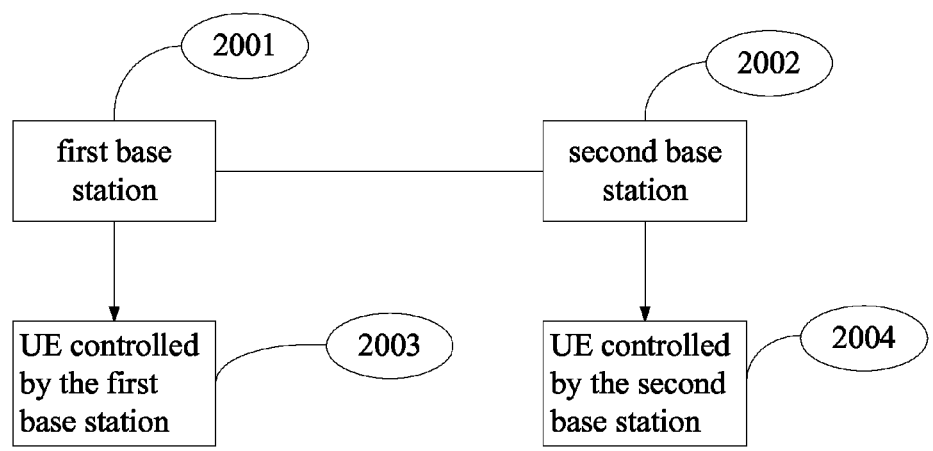
FIG. 21 is a schematic diagram of a structure of a system for uplink resource allocation provided by an embodiment of the present disclosure.

An embodiment of the present disclosure provides a system for uplink resource allocation, as shown in FIG. 21, including: a first base station 2001, a second base station 2002, a user equipment (UE) 2003 served by the first base station and a user equipment (UE) 2004 served by the second base station.

Specifically, the first base station 2001 is configured to determine UL ABS subframe(s) unused currently of the UE 2003 served by the first base station 2001; send information of the determined UL ABS subframe(s) unused currently of the UE 2003 served by the first base station 2001 to the second base station 2002, so that the second base station 2002 acquires available UL ABS subframe(s) and takes the available UL ABS subframe(s) as uplink subframe resource(s) of the second base station 2002.

The second base station 2002 is configured to receive the information of the UL ABS subframe(s) sent by the first base station 2001, acquire the available UL ABS subframe(s) according to the information of the UL ABS subframe(s) and allocate UL ABS subframe resource(s) to the UE 2004 served by the second base station 2002.

According to the system for uplink resource allocation provided by the embodiment of the present disclosure, the first base station determines the UL ABS subframe(s) unused currently of the UE served by the first base station in all UL ABS subframe(s), and sends the information of the determined UL ABS subframe(s) unused currently of the UE served by the first base station to the second base station, so that the second base station acquires the available UL ABS subframe(s). When the second base station and the user equipment (UE) served by the second base station use the UL ABS subframe(s), it may be ensured that no instruction information is sent by the first base station and the UE served by the first base station in the above-mentioned UL ABS subframe(s), thereby further reducing interference of service transmission between cell uplinks.

The foregoing descriptions are merely specific implementation manners of the disclosure, rather than limiting the protection scope of the disclosure. Any change or substitution that is readily conceived for any one skilled in the art within the technical scope disclosed by the disclosure shall fall into the protection scope of the disclosure. Therefore, the protection scope of the present disclosure shall be defined by the claims.

What is claimed is:

1. A method for uplink resource allocation, comprising:
   determining, by a first base station, one or more uplink almost blank subframe (UL ABS) subframes unused currently by a user equipment (UE) served by the first base station according to one or more downlink almost blank subframe (DL ABS) subframes and a sequential relationship, wherein the first base station takes all UL ABS subframes as the UL ABS subframes unused currently by the UE;
   sending, by the first base station, information of the determined one or more UL ABS subframes to a second base station, so that the second base station acquires one or more available UL ABS subframes and takes the one or more available UL ABS subframes as uplink subframe resources of the second base station;
   sending, by the first base station, information of the one or more UL ABS subframes to the UE served by the first base station; and
   sending, by the first base station, signaling resource scheduling information or control information to the UE, so that the UE processes instruction information according to the signaling resource scheduling information or the control information, wherein the signaling resource scheduling information is used for instructing the UE to schedule a piece of information using the one or more UL ABS subframes in the instruction information in one or more idle uplink subframes except the one or more UL ABS subframes for sending, and the control information is used for instructing the UE not to send a piece of information using the one or more UL ABS subframes in the instruction information.

2. The method of claim 1, wherein before the determining, by the first base station, the one or more UL ABS subframes unused currently by the UE served by the first base station, the method further comprises:
   receiving, by the first base station, a UL ABS resource request message sent by the second base station.

3. The method of claim 2, wherein the UL ABS resource request message is included in a request indication message, and the request indication message is a message sent by the second base station to the first base station for requesting one or more downlink almost blank subframe (DL ABS) subframes of the first base station.

4. The method of claim 3, wherein the receiving, by the first base station, the UL ABS resource request message sent by the second base station is before sending, by the first base station, a second resource state request message to the second base station.

5. A method for uplink resource allocation, comprising:
   determining, by a first base station, one or more uplink almost blank subframe (UL ABS) subframes unused currently by a user equipment (UE) served by the first base station; and
   sending, by the first base station, information of the determined one or more UL ABS subframes to a second base station, so that the second base station acquires one or more available UL ABS subframes and takes the one or more available UL ABS subframes as uplink subframe resources of the second base station;
   wherein before the determining, by the first base station, the one or more UL ABS subframes unused currently by the UE served by the first base station, the method further comprises:
     sending, by the first base station, a second resource state request message to the second base station to obtain use condition information of one or more downlink almost blank subframe (DL ABS) subframes of the second base station; and
     receiving, by the first base station, information of the one or more DL ABS subframes used by the second base station sent by the second base station;
   wherein the determining, by the first station, the one or more UL ABS subframes unused currently by the UE served by the first station comprises:
     adjusting, by the first base station, one or more UL ABS subframes having a sequential relationship with the used one or more DL ABS subframes to be idle according to the received information of the one or more DL ABS subframes used by the second base station, and taking the one or more idle UL ABS subframes as the one or more UL ABS subframes unused currently by the UE.

6. A base station, comprising:
a processor configured to determine one or more uplink almost blank subframe (UL ABS) subframes unused currently by a user equipment (UE) served by the base station; and
a transmitter configured to send information of the one or more UL ABS subframes unused currently by the UE to a second base station, so that the second base station acquires one or more available UL ABS subframes and takes the one or more available UL ABS subframes as uplink subframe resources of the second base station;
wherein the processor is further configured to:
 determine one or more UL ABS subframes according to downlink almost blank subframe (DL ABS) subframes and a sequential relationship; and
 determine all the UL ABS subframes as the one or more UL ABS subframes unused currently by the UE; and
wherein the transmitter is configured to send information of the one or more UL ABS subframes determined from all the UL ABS subframes to the UE served by the base station, and send signaling resource scheduling information or control information to the UE, so that the UE processes instruction information according to the signaling resource scheduling information or the control information, wherein the signaling resource scheduling information is used for instructing the UE to schedule a piece of information using the one or more UL ABS subframes in the instruction information in one or more idle uplink subframes except the one or more UL ABS subframes for sending, and the control information is used for instructing the UE not to send a piece of information using the one or more UL ABS subframes in the instruction information.

7. The base station of claim 6, further comprising:
a receiver configured to receive a UL ABS resource request message sent by the second base station.

8. The base station of claim 7, wherein the UL ABS resource request message is included in a request indication message, and the request indication message is a message sent by the second base station to the first base station for requesting one or more downlink almost blank subframe (DL ABS) subframes of the first base station.

9. A base station, comprising:
a processor configured to determine one or more uplink almost blank subframe (UL ABS) subframes unused currently by a user equipment (UE) served by the base station; and
a transmitter configured to send information of the one or more UL ABS subframes unused currently by the UE to a second base station, so that the second base station acquires one or more available UL ABS subframes and takes the one or more available UL ABS subframes as uplink subframe resources of the second base station; and
a receiver;
wherein the transmitter is further configured to send a second resource state request message to the second base station to obtain use condition information of one or more downlink almost blank subframe (DL ABS) subframes of the second base station;
wherein the receiver is configured to receive information of the one or more DL ABS subframes used by the second base station sent by the second base station;
wherein the processor is configured to adjust one or more UL ABS subframes having a sequential relationship with the one or more used DL ABS subframes to be idle according to the information of the one or more DL ABS subframes used by the second base station received by the receiver; and
wherein the processor is configured to select the one or more idle UL ABS subframes as the one or more UL ABS subframes unused currently by the UE.

10. A system for uplink resource allocation, comprising:
a first base station,
a second base station,
a user equipment (UE) served by the first base station, and
a user equipment (UE) served by the second base station,
wherein the first base station is configured to determine one or more UL ABS subframes unused currently by the UE served by the first base station, send information of the determined one or more UL ABS subframes unused currently by the UE served by the first base station to the second base station, so that the second base station acquires one or more available UL ABS subframes and takes the one or more available UL ABS subframes as uplink subframe resources of the second base station; and
wherein the second base station is configured to receive the information of the one or more UL ABS subframes sent by the first base station, acquire the one or more available UL ABS subframes according to the information of the one or more UL ABS subframes and allocate UL ABS subframe resources to the UE served by the second base station;
wherein the first base station is configured to:
 determine one or more UL ABS subframes according to downlink almost blank subframe (DL ABS) subframes and a sequential relationship;
 determine all the UL ABS subframes as the one or more UL ABS subframes unused currently by the UE; and
 send information of the one or more UL ABS subframes determined from all the UL ABS subframes to the UE served by the base station, and send signaling resource scheduling information or control information to the UE, so that the UE processes instruction information according to the signaling resource scheduling information or the control information, wherein the signaling resource scheduling information is used for instructing the UE to schedule a piece of information using the one or more UL ABS subframes in the instruction information in one or more idle uplink subframes except the one or more UL ABS subframes for sending, and the control information is used for instructing the UE not to send a piece of information using the one or more UL ABS subframes in the instruction information.

* * * * *